United States Patent
Kasriel et al.

(10) Patent No.: US 6,963,874 B2
(45) Date of Patent: Nov. 8, 2005

(54) WEB-SITE PERFORMANCE ANALYSIS SYSTEM AND METHOD UTILIZING WEB-SITE TRAVERSAL COUNTERS AND HISTOGRAMS

(75) Inventors: Stephane Kasriel, San Francisco, CA (US); Sara Swanson, Los Gatos, CA (US); Walter Mann, San Francisco, CA (US)

(73) Assignee: Digital River, Inc., Eden Prairie, MN (US)

( * ) Notice: Subject to any disclaimer, the term of this patent is extended or adjusted under 35 U.S.C. 154(b) by 310 days.

(21) Appl. No.: 10/128,594

(22) Filed: Apr. 22, 2002

(65) Prior Publication Data

US 2003/0130982 A1 Jul. 10, 2003

Related U.S. Application Data

(60) Provisional application No. 60/347,389, filed on Jan. 9, 2002.

(51) Int. Cl.[7] ............................................. G06F 17/30
(52) U.S. Cl. ..................... 707/10; 707/104.1; 709/224; 709/219
(58) Field of Search ....................... 707/10, 102, 104.1; 709/224, 203, 219

(56) References Cited

U.S. PATENT DOCUMENTS

| | | | |
|---|---|---|---|
| 5,892,917 A | | 4/1999 | Myerson |
| 5,913,033 A | | 6/1999 | Grout |
| 6,018,619 A | * | 1/2000 | Allard et al. ............... 709/224 |
| 6,112,238 A | | 8/2000 | Boyd et al. |
| 6,304,904 B1 | * | 10/2001 | Sathyanarayan et al. .... 709/224 |
| 6,308,210 B1 | | 10/2001 | Fields et al. |
| 6,330,596 B1 | | 12/2001 | Stuckman et al. |
| 6,341,310 B1 | | 1/2002 | Leshem et al. |
| 6,393,479 B1 | | 5/2002 | Glommen et al. |

(Continued)

OTHER PUBLICATIONS

U.S. Appl. No. 10/079,932, filed Feb. 19, 2002, Kasriel.
U.S. Appl. No. 10/128,596, filed Apr. 22, 2002, inventor Kasriel.
U.S. Appl. No. 10/128,595, filed Apr. 22, 2004, inventor Kasriel.
U.S. Appl. No. 10/128,594, filed Apr. 22, 2002, inventor Kasriel et al.
U.S. Appl. No. 10/128,598, filed Apr. 22, 2002, inventor Kasriel et al.
U.S. Appl. No. 10/734,910, filed Dec. 11, 2000, inventor Kasriel et al.
U.S. Appl. No. 10/079,932, filed Feb. 19, 2002, inventor Kasriel.

Primary Examiner—Leslie Wong
(74) Attorney, Agent, or Firm—Shawn B. Dempster

(57) ABSTRACT

A data collection system collects statistics related to each visit to each web-page within a web-site. In addition to collecting path information related to traversals to and from each web-page, the system collects information regarding the particular session, such as the visitor's connection speed, the time required to download the web-page to the visitor's system, the duration of time that the visitor spent at the page, whether the user clicked the 'back' button to leave the site, and so on. The data reporting system presents statistics based on the collected data in an easy-to-use and easy-to-understand form that is customizable by the user. By collecting and reporting performance factors related to each web-page, or sets of web-pages within a web-site, marketers and webmasters can address any perceived deficiencies and/or can optimize the performance of select pages to achieve specific marketing objectives. To optimize performance and minimize storage requirements, the data collection system uses a two-stage storage architecture. Data is collected in one or more registers in a sequential fashion, and transferred to a database periodically.

28 Claims, 5 Drawing Sheets

U.S. PATENT DOCUMENTS

| | | |
|---|---|---|
| 6,396,810 B1 | 5/2002 | Hebel |
| 6,449,739 B1 | 9/2002 | Landan |
| 6,466,970 B1 * | 10/2002 | Lee et al. ............... 709/217 |
| 6,591,298 B1 * | 7/2003 | Spicer et al. ............ 709/224 |
| 6,597,377 B1 | 7/2003 | MacPhail |
| 6,732,088 B1 | 5/2004 | Glance |
| 6,735,604 B2 * | 5/2004 | Miller et al. ............. 707/201 |
| 6,747,762 B1 | 6/2004 | Josephsen et al. |
| 6,766,370 B2 | 7/2004 | Glommen et al. |
| 6,820,236 B1 | 11/2004 | Bates et al. |
| 6,826,595 B1 | 11/2004 | Barbash et al. |
| 2001/0037359 A1 | 11/2001 | Mockett et al. |
| 2002/0052947 A1 | 5/2002 | Duimovich et al. |
| 2002/0087679 A1 * | 7/2002 | Pulley et al. ............ 709/224 |
| 2002/0091817 A1 * | 7/2002 | Hill et al. ............... 709/224 |
| 2002/0099816 A1 * | 7/2002 | Quarterman et al. ...... 709/224 |
| 2002/0129114 A1 | 9/2002 | Sundareson et al. |
| 2002/0130907 A1 | 9/2002 | Chi, et al. |
| 2002/0143933 A1 * | 10/2002 | Hind et al. .............. 709/224 |
| 2002/0188237 A1 | 12/2002 | Bradley et al. |
| 2002/0198882 A1 * | 12/2002 | Linden et al. ............ 707/10 |
| 2003/0023875 A1 | 1/2003 | Ouchi et al. |
| 2003/0033403 A1 * | 2/2003 | Rhodes ................... 709/224 |
| 2003/0046383 A1 * | 3/2003 | Lee et al. ............... 709/224 |
| 2003/0069962 A1 * | 4/2003 | Pandya ................... 709/224 |
| 2003/0115333 A1 | 6/2003 | Cohen, et al. |
| 2003/0144988 A1 * | 7/2003 | Nareddy et al. .......... 707/1 |
| 2003/0170139 A1 | 9/2003 | Marshall et al. |
| 2003/0195960 A1 * | 10/2003 | Merriam ................. 709/224 |
| 2003/0196164 A1 | 10/2003 | Gupta et al. |
| 2004/0138946 A1 | 7/2004 | Stolze |
| 2004/0163042 A1 | 8/2004 | Altman |
| 2004/0189713 A1 | 9/2004 | Thames et al. |

* cited by examiner

WEB-SITE PERFORMANCE ANALYSIS SYSTEM AND METHOD UTILIZING WEB-SITE TRAVERSAL COUNTERS AND HISTOGRAMS

RELATED APPLICATIONS

This application claims the benefit of U.S. Provisional Application No. 60/347,389, filed 9 Jan. 2002, entitled "Dynamic Path Analysis."

This application is related to U.S. patent application Ser. No. 10/128,598, filed Apr. 22, 2002, entitled "Interactive Path Analysis", which is herein incorporated by reference.

BACKGROUND OF THE INVENTION

1. Field of the Invention

This invention relates to the field of computer networks, and in particular to a system and method that facilitates an analysis of the traffic patterns and performance of sites on a network.

2. Description of Related Art

Traffic analysis is a necessary tool for effective web-site management and on-going web-site development, as well as for the development of effective marketing strategies. Web-site managers, hereinafter webmasters, desire information that can be used to enhance the web-site's performance or appearance. Electronic-commerce marketing managers, hereinafter marketers, desire information that can be used to enhance the sales resulting from visits to a web-site, to enhance advertising revenue from the web-site, and/or to determine the effectiveness of advertising expenses to other web-site providers.

Tools are commonly available for collecting traffic data. A fundamental tool, for example, collects data regarding the number of times each page at a web site is accessed within a given period of time (e.g. 'hit-rate' statistics). A more sophisticated tool, such as the Netflame™ product from Fireclick, Inc., collects data regarding entries to and exits from each page at a web site. By tracking visitor' paths through the website, a Netflame™-enabled web-site can be configured to anticipate a next-page that a visitor is likely to visit, and can initiate a download of some or all of the anticipated next-page while the visitor is viewing the current page. In this manner, the performance of the web-site is significantly enhanced, because, from the visitor's perspective, the anticipated next-page appears to download instantaneously. Only if the visitor chooses an unanticipated next-page will the visitor experience the true download delay duration.

Copending U.S. patent application Ser. No. 09/734,910, filed Dec. 11, 2000 and entitled "Predictive Pre-Download Using Normalized Network Object Identifiers", discloses a preferred technique for determining and downloading the anticipated next-page. Of particular note, this copending application also discloses the concept of a "normalized" web-page, wherein alternative versions of a web-page are analyzed and processed as a single web-page. That is, alternative versions of a web-page may include an element that varies, depending upon the environment, the particular viewer, the class of viewer, a currently advertised special, and so on. Each version may potentially correspond to a different web-page, because each version may have a different URL (Uniform Resource Locator). If processed and analyzed separately, the individual statistics that are associated with each of the different versions of a web-page would generally be meaningless. A normalized web-page comprises all of the non-varying elements of the alternative versions, and the data collected corresponding to each of the alternative versions is associated with the normalized web-page. In this manner, statistics are provided for the web-page, independent of variables associated with the web-page. For ease of reference and understanding, the term web-page as used herein includes a normalized web-page, and other collections of pages, files, and data that form a cohesive entity for traffic-analysis reporting purposes. For example, copending U.S. patent application Ser. No. 10/079,932, filed Feb. 19, 2002, entitled "Predictive Predownload of Templates with Delta Encoding," discloses the use of "templates" that correspond to the relatively unchanging portions of a web-page, and "delta-encoding" to encode the portions of a web-page that change. As defined herein, the templates with multiple and varied delta-encodings correspond to a web-page. Other examples of collections of material forming a cohesive entity for traffic-analysis will be evident to one of ordinary skill in the art.

The information provided by traffic or path analysis tools is useful, but somewhat limited. While knowledge of how visitors typically arrive at a web site, which pages they typically visit while at the site, and where they go to when they depart the web site, is useful for determining the effectiveness of the site in satisfying marketing objectives, such as the effectiveness of a page layout for directing visitors to select targets, it is somewhat limited in providing insight as to where problems may lie.

Collecting information for a more detailed analysis, however, requires substantial memory resources, particularly for web-sites that are visited hundreds or thousands of times per hour. Even if one could initially afford the memory resources to collect a detailed record of each visit to a web-page, the amount of memory resources required can be expected to grow non-linearly as the analysis system provides the feedback that is expected to facilitate a substantial increase in the popularity of the web-site. Also, as the size of the database that contains the detailed information increases with time and/or site popularity, the time to access the information in the database will increase, thereby diminishing the analysis tool's effectiveness as an interactive query system.

BRIEF SUMMARY OF THE INVENTION

It is an object of this invention to provide a data collection and reporting system that facilitates an evaluation of a web-page's performance, with memory requirements that scale reasonably with increased traffic to the web-page. It is a further object of this invention to provide a data collection and reporting system that facilitates an evaluation of a web-page's performance in the context of the website that contains the web-page. It is a further object of this invention to provide a data collection and reporting system that facilitates an evaluation of segments of visits to a web-site in the context of the entirety of the web-site.

These objects and others are achieved by providing a data collection system that collects statistics related to each visit to each web-page within a web-site using a two-stage memory utilization process. In addition to collecting path information related to traversals to and from each web-page, the system collects information regarding the particular session, such as the visitor's connection speed, the time required to download the web-page to the visitor's system, the duration of time that the visitor spent at the page, whether the user clicked the 'back' button to leave the site, and so on. Data is initially collected in memory structures that optimize the processing time and memory space required to store each parameter related to the performance of each web-page. The data in these optimized memory structures is available for immediate access by an interactive data-analysis system. At select intervals, the data in each memory structure is transferred to a database, for long-term storage, or for more detailed analyses. The data analysis system presents statistics based on the collected data in an easy-to-use and easy-to-understand form that is customizable by the user. By collecting and reporting performance factors related to each web-page, or sets of web-pages within a web-site, marketers and webmasters can address any perceived deficiencies and/or can optimize the performance of select pages to achieve specific marketing objectives. By storing current data in a memory structure, and older data in a database, memory resources are conserved, and increases in the size or popularity of the web-site can be accommodated without substantially affecting the performance of the data analysis system.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

This invention is presented herein using the paradigm of a path-analysis system having the capabilities of the aforementioned Netflame™ product from Fireclick, Inc. As will be evident to one of ordinary skill in the art, the principles of this invention are applicable to other traffic-analysis and path-analysis systems and products.

Figure 1:
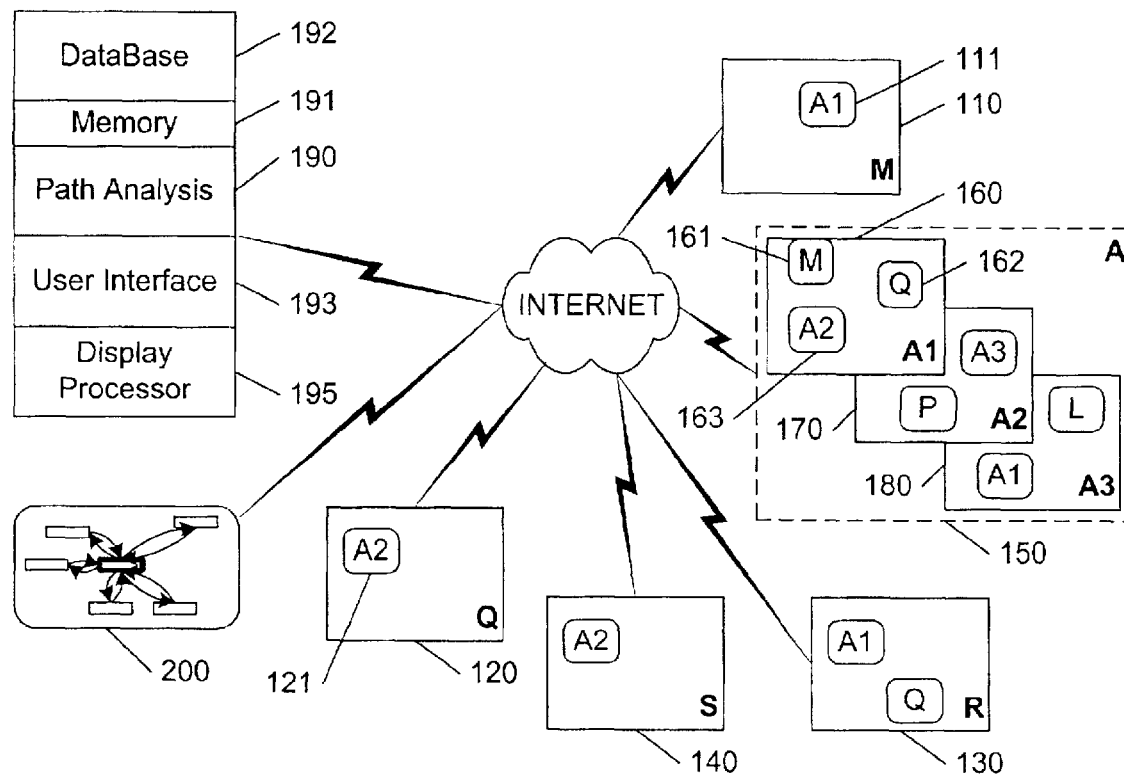
FIG. 1 illustrates an example block diagram of a web-site performance analysis system in an Internet environment in accordance with this invention.

FIG. 1 illustrates an example block diagram of a web-page performance analysis system in an Internet environment in accordance with this invention. A number of web-sites M 110, Q 120, R 130, S 140, and A 150 are illustrated as being a part of the Internet network. Web-site A 150 is illustrated as containing three web-pages 160, 170, 180, whereas, for ease of understanding web-sites M 110, Q 120, R 130, and S 140 are illustrated as single web-pages.

Each of the web-pages 110–180 is illustrated as containing one or more "buttons" for traversing to another web-page. Web-page M 110, for example, contains a button 111 that effects a traversal to web-page A1 160. Web-page Q 120 contains a button 121 that effects a traversal to web-page A2 170. Web-page A1 160 contains buttons 161, 162, 163 that effect a traversal to web-pages M 110, Q 120, and A2 170, respectively. Not illustrated, conventional web-browsers include "back" and "forward" buttons for traversing to prior accessed web-pages.

Also illustrated in FIG. 1 is a performance-analysis block 190 that is configured to detect and record traversals to and from select web-sites, and to record performance-related data associated with each visit to the select web-sites. In the aforementioned Netflame™ product, a subscriber to the performance-analysis program adds a line of program code to each web-page. This line of program code effects a recording of data associated with each visit to the web-page. Preferably, as discussed further below, a two-stage data storage process is employed to facilitate rapid retrieval of current information from a memory 191, and efficient long-term storage in a database 192 for more detailed analyses. For the purposes of this disclosure, a database is any collection of data that facilitates efficient retrieval of the data, and may include a distribution of data storage entities. In this example, the performance-analysis block 190 accesses the memory 191 and the database 192 to record data and retrieve statistics related to visits to each web-page A1–A3 160–180 of the subscribing web-site A 150. In like manner, the performance-analysis block 190 may correspond to multiple performance-analysis systems. One system may be configured, for example, to record parametric data, such as the number of visits, the duration of visits, and so on, while another system may be configured to record information related to the visitors to the site, and yet another configured to record traversal information.

Copending U.S. patent application Ser. No. 10/128,598, filed Apr. 22, 2002, entitled "INTERACTIVE PATH ANALYSIS", teaches a user interface 193 and display processor 195 that are configured to display the rate of traversals among web-pages, preferably as a directed graph 200, and is incorporated by reference herein.

Figure 2:
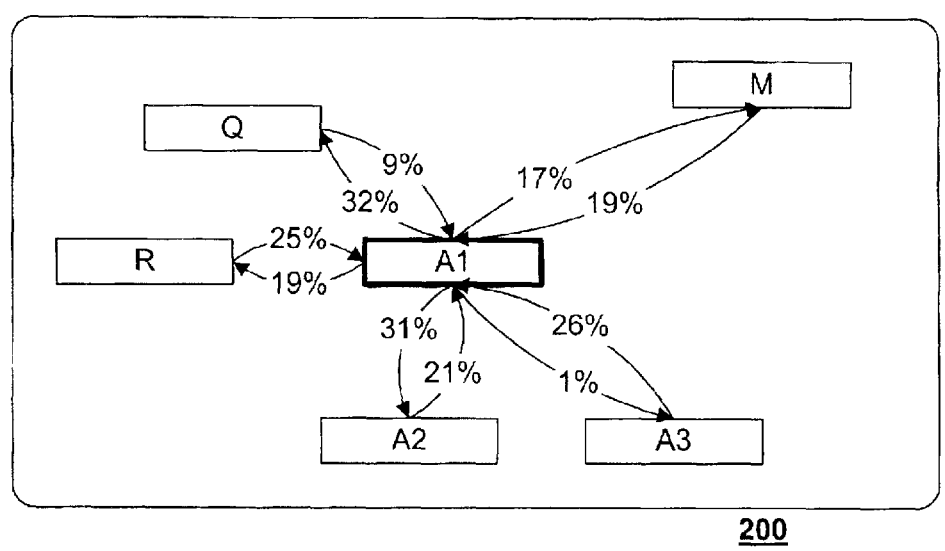
FIG. 2 illustrates an example graphic display of path analysis information in accordance with one aspect this invention.

FIG. 2 illustrates an example graphic display 200 of traversal information in accordance with this copending application. In this example, the web-pages and the traversals between the web-pages are illustrated as nodes and links, respectively, in a directed graph.

In the example display 200, web-page A1 has been identified as the target, and all of the traversals to and from web-page A1 are illustrated. The percentages associated with each link represent the percentage of traversals to and from A1, relative to node A1. For example, the link from node R to A1 indicates 25%. This figure indicates that 25% of the traversals to A1 arrive from node R. In like manner, 9% of the traversals to A1 are from Q, 19% from M, 21% from A2, and 26% from A3, thereby accounting for 100% of the traversals to A1. Regarding traversals from node A1, 19% are to R, 32% to Q, 17% to M, 31% to A2, and 1% to node A3.

This graphic presentation presents useful information to a marketer or a Webmaster. Note, for example, that although 25% of the traversals to node A1 are from node R, 19% of the traversals are back to node R. As illustrated in FIG. 1, the example web-page A1 160 does not have a button for linking to node R. Therefore, the 19% of the traversals from A1 to R must have been in response to a visitor hitting the "back" button on the visitor's browser. Typically, a user hits the back button when the visitor discovers that the content of the selected page was not what the visitor was looking for, or when the visitor loses patience with an excessive download delay or other web-page anomaly. From a marketing viewpoint, the presentation of A1 at web-page R is apparently very effective for bringing visitors to A1 from R, but most of these visitors are apparently disappointed when they arrive at A1, and return to R. Other insights can be gained from this presentation, as will be evident to one of skill in the art of e-commerce. Note, however, that deriving an insight from the presentation of the copending application involves a deductive process, and may not provide a complete picture. That is, one must notice that node R is not a button on page A1, and thus the link must correspond to hitting the "back" button from A1 to return to node R. Also, it is not clear how many other departures from A1 correspond to hitting the "back" button, and therefore the problem with A1 may be more serious than the graph of FIG. 2 may reflect.

In accordance with this invention, the collected data includes substantially more data than a mere count of the number of traversals to and from each web-page. By collecting this additional information, more meaningful reports can be provided, and conclusions can be easily drawn without employing a multi-stage deductive process. In a preferred embodiment of this invention, the data includes an identification of the web-page from which the visitor arrived, a connection speed, a measure of the time required to complete the download of the web-page to the visitor, a measure of the time that the visitor remained at the web-page, and an identification of the web-page to which the visitor went upon leaving this web-page. Supplemental information, such as whether the visitor departed by hitting the "back" button, whether the user departed before the download was completed, and so on, may also be recorded to facilitate the reporting process, even though this information could be derived from the other data that is recorded. Other information, such as an identification of the visitor, the time of day of the visit, and so on, may also be stored. In a preferred embodiment, a visitors traversals through the web-site is tracked as a linked set of records. That is, the first record corresponds to the page at which the visitor entered the site, and subsequent traversals within this site are linked to this first record. In this manner, the total time that each visitor remains at the site, the number of pages visited, the entry and exit pages, and so on, can be determined and reported. For efficiency in data storage and retrieval, a relational database structure is preferably employed. For example, a database containing the record of a particular visit may merely contain an identification of the visitor, and a related database may contain information regarding the visitor, such as whether the visitor has purchased from the site, the total amount of past purchases, the total number of visits, the visitor's preferences, and so on.

Figure 3A:
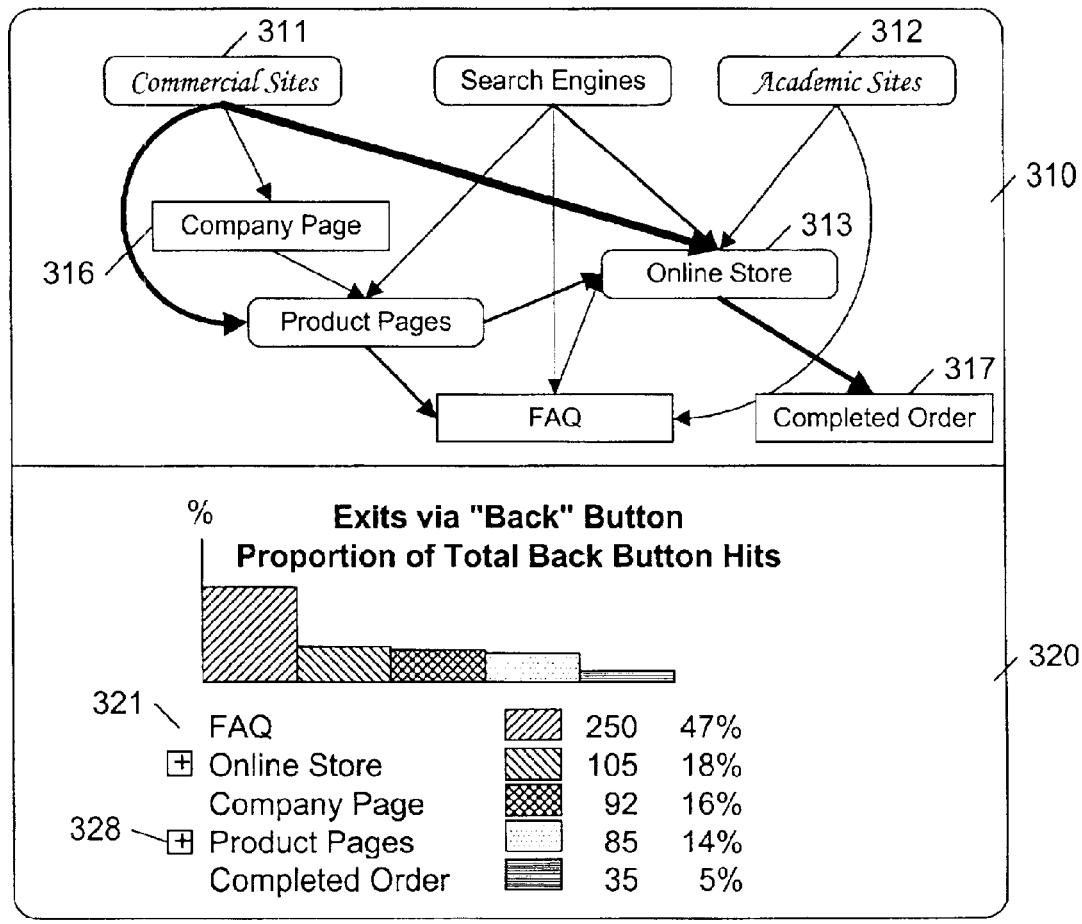
FIGS. 3A–3B illustrate an example graphic display of path analysis information and alternative view of webpage performance measures in accordance with this invention.

FIG. 3A illustrates a display 300 of path-analysis 310 and performance 320 information in accordance with an aspect of this invention. In accordance with the referenced copending application, the user is provided the option of customizing the displayed path-analysis output 310. The user is provided the option of assigning "alias" names to each of the nodes, to display a more intuitively meaningful display. The user is also provided the option of changing the size, shape, color, and other visible features of the nodes and links in the graph. The directed graph 310 of the display 300 of FIG. 3A illustrates a customized display, wherein names are provided to the nodes, and the thickness of the links between nodes indicate the volume of traversals between the nodes.

The performance display 320 of this invention employs the same user-defined aliases, if available, for identifying each web-page or group of web pages. In the example of FIG. 3A, web pages that are grouped into a single node are identified as nodes that have curved corners. For example, the user may have defined all external sites ending with ".com" as "Commercial Sites" 311, all external sites ending with ".edu" as "Academic Sites" 312, and so on In this example, the site "Online Store" 313 is also identified as a group of pages, and may correspond to the multiple pages of a vendors on-line catalog. Conversely, the "Company page" 316 and "Completed Order" 317 nodes on the graph represent single web-pages. For ease of reference, the term "page" is used hereinafter to refer to either a single web-page or a collection of web-pages that are represented as a single node.

The performance display 320 of this example illustrates the number of "back" button exits from each of the nodes. Referring to FIG. 1, the user selects the particular performance parameter via the user interface 193, and the performance-analysis block 190 extracts the appropriate information from either the memory 191 or the database 192, depending upon the particular request. As discussed below, the memory 191 is structured to contain data related to recent visits to the web-site, whereas the database 192 is structured to contain archive information, and links to ancillary information that facilitates more complex analyses. The display processor 195 provides the display 320 of FIG. 3A corresponding to the selected parameter, in this example, the number of exits from each node in response to the visitor hitting the "back" button, or otherwise returning to the site from which the visitor arrived.

At 321 of FIG. 3A, the FAQ (Frequently Asked Questions) node is indicated as having the highest proportion of exits from the node caused by the user hitting the "back" button. Note that although hitting the "back" button, or "backtracking", is generally considered indicative of a potential problem, in this example, backtracking is an expected response from a FAQ page, because once the visitor's question is answered, or determined not to be a frequently asked question, the visitor is expected to go back to the previous page. The other rates of back-button-exits appear satisfactory.

In a preferred embodiment, page names that correspond to multiple web-pages are displayed with a "+" symbol 328. If a user clicks on the "+" symbol, details regarding the multiple web-pages are displayed.

Figure 3B:
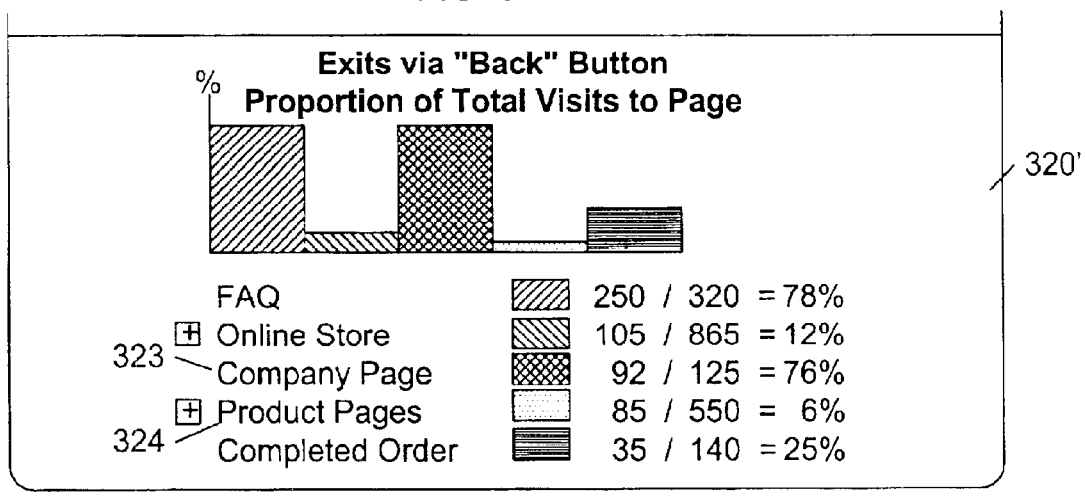

In accordance with another aspect of this invention, the user is given the option of presenting the information relative to the entire site, as in 320 of FIG. 3A, or relative to each page on the site. FIG. 3B illustrates an alternative view 320' of the number of exits from each page via hitting the "back" button. In this example, the proportion is relative to the number of visits to each page. Note that in this presentation, it is apparent that the "Company Page" node, at 323, may have a problem, because 76% of the visitors to this page exit the page via the "back" button, rather than continuing to other pages on the web-site. Conversely, the "Product Pages" node, at 324, shows a remarkably low number of exits via the "back" button (6%), indicating that it serves its purpose of directing visitors to other sites on the web-site.

Figure 4A:
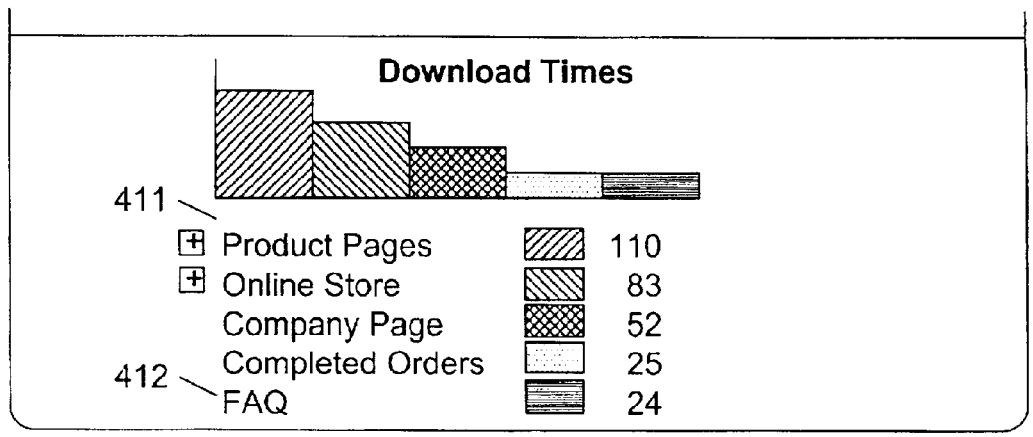
FIGS. 4A–4C illustrate example displays of web-page performance measures based on measures of time durations associated with web-pages in accordance with this invention.
Figure 4B:
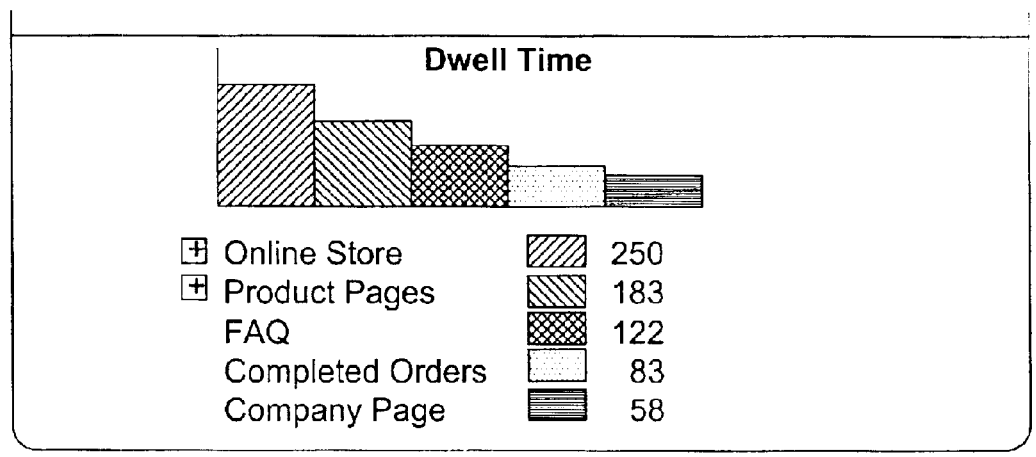
Figure 4C:
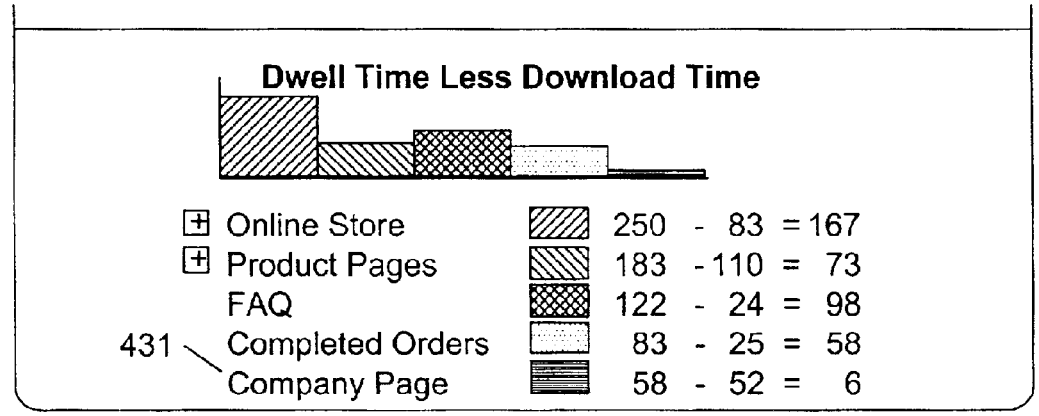

In a preferred embodiment of this invention, the data 192 is configured to contain one or more time measures that facilitate an assessment of the web page's performance, or an assessment of the interest generated by the web page. FIG. 4A illustrates a display of download times for the example web pages of FIG. 3A; FIG. 4B illustrates a display of dwell times; and FIG. 4C illustrates a display of dwell time less the download time for each web page. Dwell time is defined as the total time that a visitor remains at the web page, and is measured from the time that a visitor selects the web page to visit until the time that the visitor selects another web-page or hits a back button or other button that effects a traversal to another web page.

Generally, pictures require longer download time than text, and the display of FIG. 4A is fairly typical of a conventional web site, wherein product pages, at 411, that contain pictures of products require substantially longer time to download than a Frequently Asked Questions page, at 412, that contains text. Abnormally large or small download times could be indicative of a problem. If the page contains too many pictures, for example, a visitor may choose to leave the page before the download completes, out of boredom. Likewise, if a web page contains pictures but shows a short download time, this could be indicative of a defect on the page that causes the download to abort prematurely. In a preferred embodiment, the user is provided the option of normalizing the download times based on the connection speed of each visit, to distinguish between the amount of data that is being downloaded and the bandwidth used to communicate this data.

In a preferred embodiment of this invention, because speed has a substantial impact on the perceived performance of a web-site, a number of timing parameters are collected and made available for reporting. For example, the typical web-page download process includes the following sub-processes:

1. (optional) DNS lookup to find the web server;
2. establish a TCP connection to request the content from the server;
3. server generates the content;
4. client receives first byte of the content;
5. client receives remainder of the content;
6. images and other page objects of the content are requested and retrieved; and
7. content is parsed and displayed.

In a preferred embodiment, the time associated with each of these subprocesses is measured. By providing these subprocess time measures, a webmaster is able to distinguish, for example, between delays caused by the slow generation of the web-page by the server, and delays caused by the actual transmission of the web-page.

As noted above, some time measures are optionally normalized based on the connection speed, to more easily distinguish the factors that affect a websites performance. Although the nominal, or "theoretical", connection speed (19.2kbs, 56.6kbs, etc.) of a visitor's communication channel may be used to provide this normalization, an "effective connection speed" that reflects the actual throughput to the visitor is preferably used. For example, in the aforementioned Netflame™ product, the time required to pre-download a known amount of content material is used to determine this "effective connection speed". Because this content material is downloaded to a visitors system as a "background" process, the time required to download the material is free of delays that may be introduced as the material is being processed or displayed in a conventional, non-pre-download system. The use of the actual, or effective, connection speed allows a webmaster to distinguish between problems related to bandwidth limitations to the visitor and problems related to an overburdened server.

Other performance measures based on time durations will be evident to one of ordinary skill in the art in view of this disclosure. For example, FIG. 4B illustrates the average dwell time that a visitor remains at each of the web pages. Short duration dwell times may indicate potential problems, except if the page is purposely designed to be a gateway to other pages. If the page is intended to be a gateway, such as a table of contents, a long dwell time may indicate a poorly organized or confusing page layout. FIG. 4C illustrates the average dwell time less the download time, and is somewhat more indicative of the interest that a web page generates. In this example, it is again evident that the Company Page 431 has a problem, because the typical user spends only 6 seconds at the page after it is downloaded. As with the download time, the dwell time may be further partitioned for more detailed analyses, or multiple dwell times may be aggregated to form meaningful statistics. For example, an often used time measure is the time required for a user to complete the "checkout" process, which often includes visits through a plurality of web-pages. In this example, a start-timer event is triggered when the visitor is first presented the checkout page, and a stop-timer event is triggered when the visitor exits the last checkout page. That is, the measures of time duration, or other performance measures, need not be limited to events at a single page.

Figure 5A:
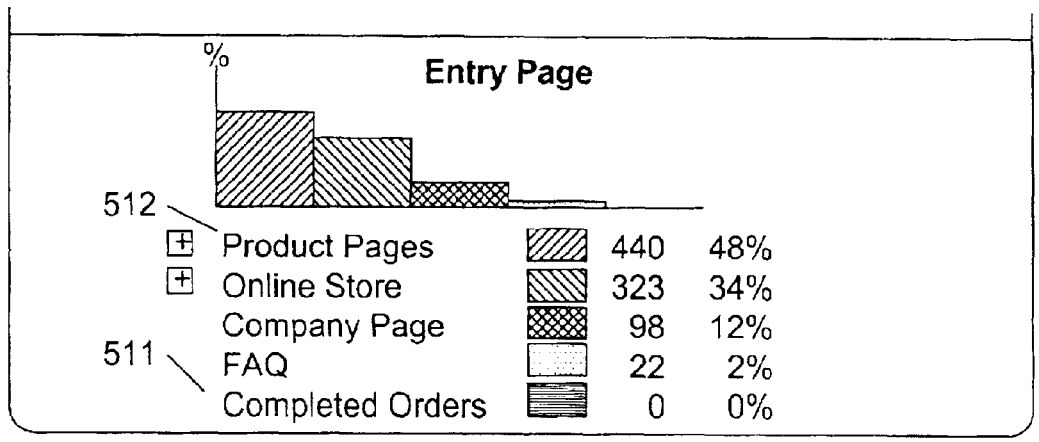
FIGS. 5A–5C illustrate example displays of web-page performance measures based on the order and frequency of visits to web-pages in accordance with this invention.

Other performance measures and displays will be evident to one of ordinary skill in the art in view of this disclosure. In a preferred embodiment of this invention, the data 192 contains path-analysis information that facilitates an assessment of each page's performance relative to the web site. FIG. 5A, for example, illustrates the distribution of entry visits among the web pages; that is, how often the web site is visited via the particular web page. In this example, the Completed Orders page, at 511, shows that no visitors arrived at the site via this page, as would be expected. The example of FIG. 5A illustrates, at 512, that most visitors arrive via the product pages, which would indicate, for example, a success in attracting visitors via ads for products at other web sites. As would be evident to one of ordinary skill in the art, this display would be very effective in determining the effectiveness of a directed-ad campaign, such as a mass emailing campaign, wherein a unique page is used as the entry portal that is identified in the directed-ad. In a preferred embodiment of this invention, the data that is collected also includes ancillary information regarding visits from external sites, such as an identification of a search engine that the visitor used, the specific query that the visitor submitted, the ranking of this web-page in response to this query, and so on.

Figure 5B:
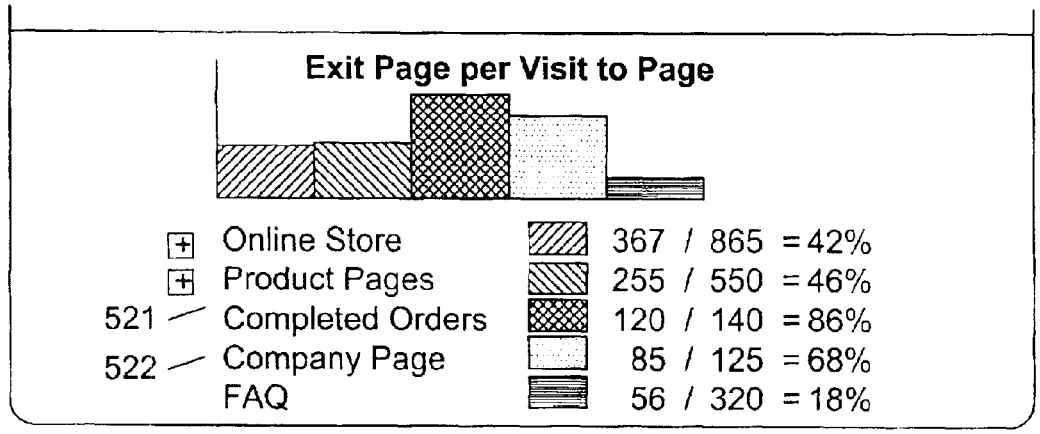

FIG. 5B illustrates the number of exits from the web site, via each page, relative to the number of visits to the page. The Completed Orders page, at 521, shows a high proportion of visitors exiting the site after completing an order, which is to be expected. The Company Page, at 522, shows that 68% of all visitors to the Company Page exit the site, again indicating a potential problem with this web page.

Figure 5C:
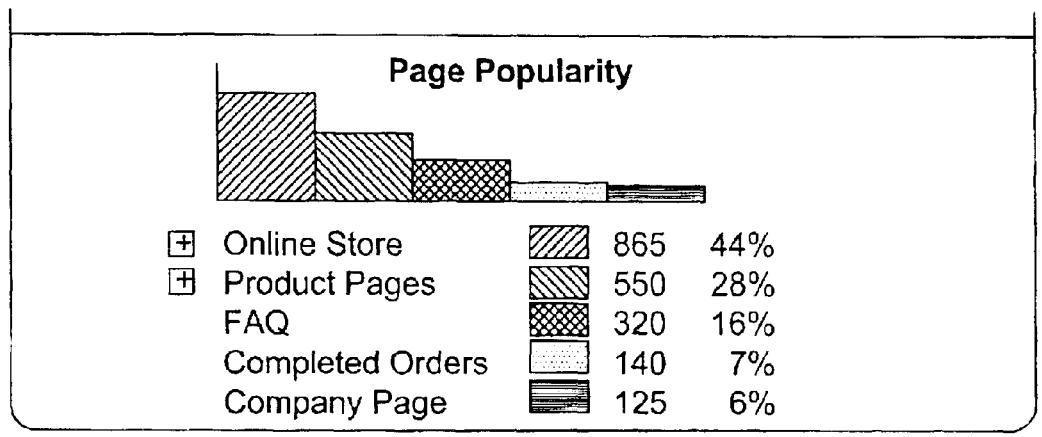

FIG. 5C illustrates the total number of visits to each page, thereby providing an indication of the popularity of each page. From this display, for example, a webmaster can determine where development and maintenance resources should be applied to achieve the best return on investment. In like manner, if a page's popularity is below expectations, a marketer or webmaster may investigate the matter further to determine whether a problem exists.

In view of the amount of detail that is reported by the web-analysis system, the web-analysis system of this invention preferably includes a storage structure that facilitates effective and efficient web-site analysis. In accordance with this invention, a two-stage storage scheme is employed for the parametric data that is used to determine the performance measures discussed above. Data is stored in a first storage area that provides for relatively high-speed storage and access, then stored in a second storage area that is relatively slower, but substantially less costly and/or more versatile than the first storage area. In a preferred embodiment, specific structures are employed at the first stage to provide effective and efficient storage in a memory 191 that is preferably local to the web-analysis process 190. At the second stage, a database 192 is employed to provide efficient long-term storage of the data, and to facilitate analyses that use conventional data-base access and processing techniques, such as sophisticated searching and sorting tasks.

Figure 6:
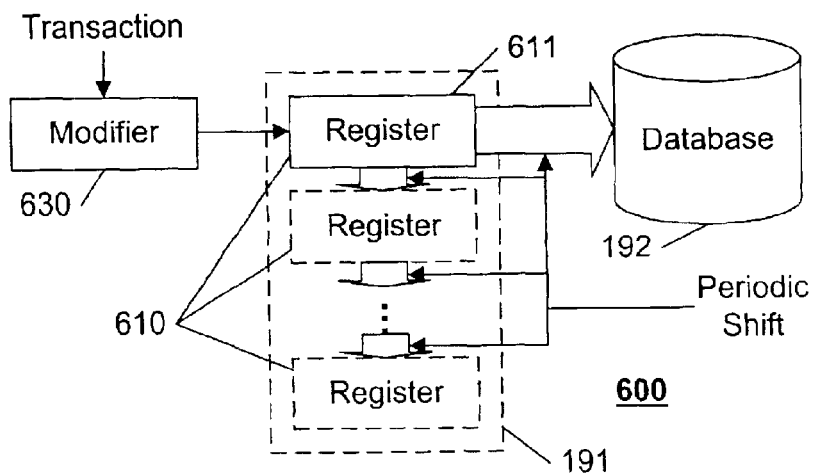
FIG. 6 illustrates an example block diagram of a web-analysis system in accordance with this invention.

FIG. 6 illustrates an example block diagram of a web-analysis system 600 that uses a two-stage storage technique in accordance with this invention. The memory 191 is illustrated as containing a plurality of registers 610, one of which 611 is coupled to a modifier 630. As transactions occur, data is recorded into the register 611. Generally, the term "register" includes a structure that is configured to contain particular data within a memory that is quickly accessible, such as a conventional random-access memory (RAM). For the purposes of this invention, the memory 191 is characterized as having a substantially faster access time for recording or retrieving data than the database 192. This faster access time may be provided via the use of different hardware for each of the memory 191 and database 192, or via the use of different software for accessing each of the memory 191 and database 192, or a combination of both. That is, for example, special purpose software or firmware may be provided to form a modifier 630 that is optimized for updating the register 611 as each transaction occurs. As is known in the art, such limited-function programs can generally be designed to be substantially faster than general-purpose programs, such as database access programs. When used with a specific structure, herein register 611, that is designed for efficient updating, as discussed further below, the efficiency and effectiveness of such limited-function programs can be enhanced substantially.

In accordance with this invention, the data that is collected in the register 611 is periodically transferred to the database 192, and the register 611 is cleared for subsequent data collection, thereby providing regular samples of the data for subsequent time-based analyses. As illustrated in the example system 600, a plurality of registers 610 may be provided, and the data sequentially shifted through these registers, thereby allowing for time-based analyses based on the data in the registers 610. For example, twenty-four registers 610 may be provided, and the periodic uploading to the database 192 may occur once per hour. In such a configuration, each register 610 reflects the data corresponding to an hour of transactions at the web-site over the course of a day. Data analyses and queries that are targeted for periods of a day or less can be optimized to access the data in the registers 610 directly, whereas longer-term analyses and queries will access the data in the database 192, albeit with less efficiency.

As will be evident to one of ordinary skill in the art, the configuration illustrated in FIG. 6 is symbolic, and alternative configurations may be used to achieve the same result. For example, the registers 610 may be organized as a circular buffer, and the "shifting" of the data is effected by sequentially connecting the modifier 630 and the database 192 to each successive register 610 in a "round-robin" fashion.

Note that the structure of the system 600 allows for a control of the size and complexity of the system, and optionally, allows for the customization of the system based on a customer's requirement. As noted above, the two-stage storage structure of this invention provides for the aggregation of data into periodic data samples. As such, the amount of data that is stored is a function of time, and not a function of the amount of traffic that a web-site experiences, thereby allowing for reliable estimates of resource requirements, and allowing for manageable/scalable growth as required. In the above hourly-upload example, the size of a week's worth of data will be equal to 7*24*(size of the register 611), regardless of the amount of traffic during the week.

The level of time-detail of subsequent analyses of the data will be based on the rate of the periodic uploads of the data from the memory 191 to the database 192. In the above example of an hourly sample rate, reports can have a time resolution of an hour, but no less. If a particular customer requires more or less resolution, the periodic upload rate can be modified accordingly, thereby increasing or decreasing the amount of data that is stored in the database 192. Similarly, the number of registers 610 determines the time span of the analyses that can be performed directly from the memory 191. By allowing the customer to define the desired memory-access time span and data resolution, the provider of the web-analysis system can determine the number of registers 610 required, and the expected size of the database 192, and charge the customer accordingly. Likewise, the customer can control the cost of this aspect of the system by the appropriate choice of required resolution and memory-access time span.

Figure 7:
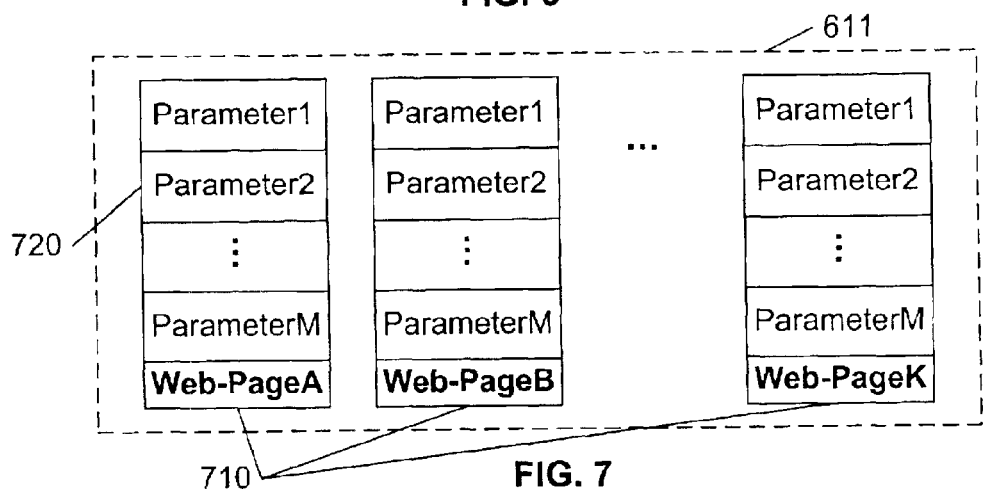
FIG. 7 illustrates an example block diagram of a register structure for facilitating the collection of parametric data associated with web-pages in accordance with this invention.

The size of the register 611 will depend upon the number of different parameters that are being measured for each page of the customer's web-site. The width of each parameter will be based on an assumed maximum limit to the value that is stored, but as long as these limits are not exceeded, the size of the register 611 will be substantially independent of the amount of traffic that the web-site experiences. FIG. 7 illustrates an example block diagram of a register structure for facilitating the collection of parametric data associated with web-pages in accordance with this invention. As illustrated, the register 611 is partitioned into blocks 710, each block being associated with a monitored web-page. Each block 710 contains memory structures 720 that are configured to contain the parameters associated with the visits to the web-page. These structures are configured to contain the data that is used for determining the performance measures discussed above, and illustrated in FIGS. 3A–B, 4A–C, and 5A–C. For example, one structure 720 may be a counter that counts the number of visits to the web-page, another structure 720 may be an accumulator for determining the average download time of the web-page, and so on. These structures 720 may be hardware structures, or software structures, as would be evident to one of ordinary skill in the art, and as discussed further below.

Figure 8:
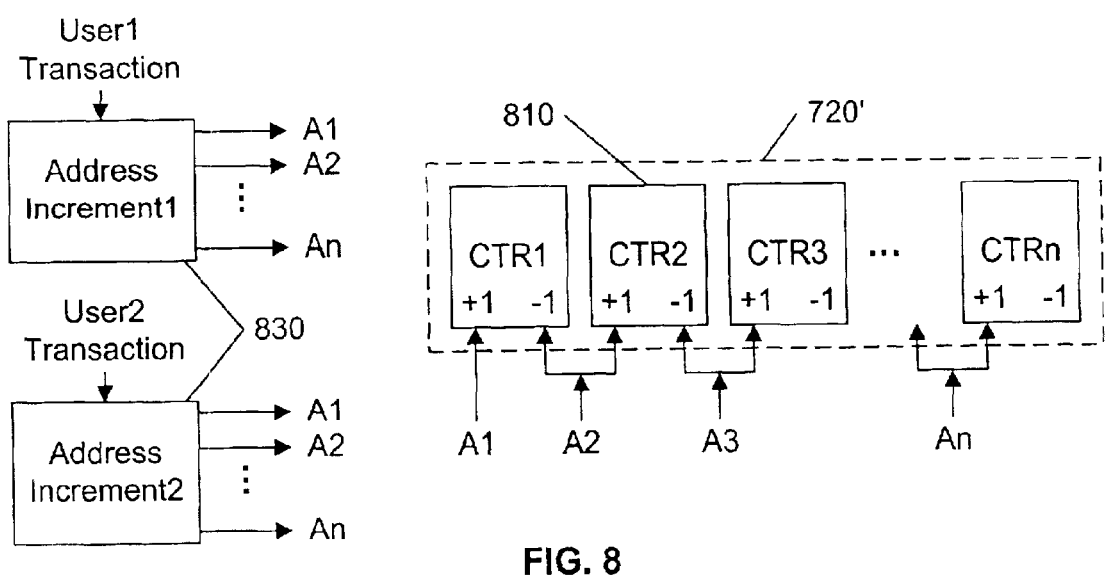
FIG. 8 illustrates an example block diagram of a register structure for facilitating the collection of histogram data in accordance with this invention.

Each of these structures 720 in the blocks 710 of the register 611 is preferably configured to allow for rapid access and updating. For example, FIG. 8 illustrates a block diagram of a register structure 720' that is particularly well suited for the collection of histogram data in accordance with this invention. This structure may be used, for example, for providing a histogram that reflects the number of pages visited during each visit to the web-site. Although a statistic such as the average number of pages visited during each visit to the web-site may provide some degree of insight to the visitor' behavior, a histogram of the distribution of pages-per-visit can provide more substantial insight. For example, an average of 4.3 pages per visit could correspond to most visitors visiting between 3 and 6 pages per visit, but it might also correspond to many visitors visiting only 1 or 2 pages, and some visitors visiting dozens of pages per visit. In the latter case, such a bimodal distribution may be the anticipated visitor behavior, at which point the analysis merely confirms proper web-site performance; alternatively, such a bimodal distribution may indicate a problem that warrants further investigation.

Illustrated in FIG. 8 are a plurality of event incrementers 830, which would typically be contained in the modifier block 630 of FIG. 6, each event incrementer 830 being associated with a visitor's session at the web-site. The incrementer 830 is initialized to zero when the visitor first arrives at the web-site. Thereafter, each time the visitors transaction corresponds to the parametric event being recorded, such as a traversal to another page on the web-site, the event incrementer 830 is incremented. This incrementation provides a trigger signal $A_1$–$A_n$, wherein the subscript of the trigger signal $A_1$–$A_n$ corresponds to the current value of the incrementer 830. This trigger signal $A_1$–$A_n$ is provided to the register structure 720' and effects a corresponding increment and decrement to counters 810 in the structure 720' as illustrated. That is, when a user first visits a web-page, the trigger $A_1$ is asserted, causing the count in CTR1 to be incremented. If the visitor subsequently exits the web-site, this incremented count remains in CTR1, and reflects a visit to the web-site wherein the number of pages visited was one. If, on the other hand, the visitor subsequently traverses to another page of the web-site, the trigger $A_2$ is asserted, and, as illustrated in FIG. 8, this assertion causes the count in CTR1 to be decremented, and the count in CTR2 to be incremented. In this manner, the counts in CTR1 and CTR2 reflect the number of visits to the web-site wherein the number of pages visited was one and two, respectively. This process of decrementing the prior counter and incrementing the next counter continues until the visitor exits the web-page, leaving the appropriate counter with an incremented count, and all prior counters with an incremented-then-decremented (i.e. unchanged) count.

As discussed above with regard to FIG. 6, the contents of the register 611 that contains this histogram structure 720' are periodically uploaded to the database 192, and the register 611 is reset to commence the collection of data for the next time period. In a preferred embodiment, immediately prior to the uploading, the counter CTR corresponding to each currently active visitor is decremented, and immediately after the uploading each of these counters is incremented, thereby providing an accurate count regardless of when the periodic uploading occurs. Alternatively, if it is assumed that the relative error caused by recording the counts in the structure 720' directly, before it is known how many pages the current visitors during the uploading event might actually visit, is slight, this pre-processing and post-processing before each uploading event can be omitted.

The structure of FIG. 8 is presented as an illustration of providing a structure 720 in the register 611 that is customized for efficient collection and reporting of data. One of ordinary skill in the art will recognize that the structures illustrated to provide a histogram-generating function can be efficiently implemented in either hardware or software, or a combination of both. For example, the event incrementer 830 function is easily embodied as a simple conditional "IF" statement in software:

"IF transaction =event THEN increment eventcount and assert eventcount".

In like manner, the structure 720' is efficiently embodied as an index-able array of variables CTR, and the assertion of the eventcount ($A_1$–$A_n$ in FIG. 8) is easily embodied as:

"decrement CTR(eventcount−1) and increment CTR(eventcount)".

One of ordinary skill in the art will recognize alternative efficient structures for embodying the histogram-structure 720' of FIG. 8. For example, the two functions of 830 and 720' may be further optimized by combining the functions and decrementing CTR(eventcount) before the eventcount is incremented, then incrementing the eventcount, then incrementing CTR(eventcount), thereby eliminating a need to compute the index eventcount−1. These and other system configuration and optimization features will be evident to one of ordinary skill in the art in view of this disclosure. For example, the incrementers 830 may serve to provide multiple parameters to the web-analysis system. A common measure that is associated with a web-page is the apparent "depth" of the web-page relative to the web-site, and is commonly measured by the number of visits to other web-pages prior to arriving at the web-page. As the visitor traverses to each web-page, the contents of the incrementer 830 corresponds to this measure of depth, and can be used to provide this measure for each web-page.

Other structures that are optimized for efficient data collection will be evident to one of ordinary skill in the art. For example, the histogram-structure of FIG. 8 can be modified to create a histogram of time durations, merely by triggering the event incrementers 830 based on time, rather than events. That is, the occurrence of a visitor transaction that corresponds to a "start-timer" event enables the incrementer 830, and as each time period occurs, the event counter $A_{1-An}$ is incremented, thereby triggering the decrementing/incrementing of the counters 810, discussed above. A "stop-timer" event disables and resets the incrementer 830. Consistent with the above mentioned multiple use of the incrementer 830, the contents of the incrementer 830 in this embodiment can also be used to provide a measure of time duration that can be accessed at each visitor transaction event, corresponding, for example, to a time-measure of the aforementioned depth of each web-page. In a typical embodiment, the incrementer 830 is triggered every second to provide a running measure of time from the "start-timer" event, while only the higher-order bits of the measured time are used to trigger the histogram counters 810. In this manner, the resolution of the measured time is not limited by the quantized step-sizes of the histogram.

The foregoing merely illustrates the principles of the invention. It will thus be appreciated that those skilled in the art will be able to devise various arrangements which, although not explicitly described or shown herein, embody the principles of the invention and are thus within its spirit and scope. For example, to further facilitate scalability, or to allow a user to further control costs, the system can be configured to monitor a limited number of web-pages, rather than all of the web-pages of a web-site. In such an embodiment, the number of blocks 710 of FIG. 7 are limited, and are used as a cache for recording data associated with the most active pages of the web-site, using a least-recently-used (LRU) strategy for evicting less-active pages from the data collection process. In this manner, accurate statistics are provided for active pages, and less accurate statistics are provided for less active pages. Alternatively, a few select pages may be identified for continuous presence in the cache, regardless of their activity level. These and other system configuration and optimization features will be evident to one of ordinary skill in the art in view of this disclosure, and are included within the scope of the following claims.

We claim:

1. A web-site performance analysis system comprising:
   a register configured to contain data relative to visits to a plurality of web-pages that are associated with a web-site, the data including:
      an identification of traversals corresponding to each visit of the visits to the plurality of web-pages, the identification of traversals having one of (i) an identification of an incoming link from which each visit originated and (ii) an identification of an outgoing link to which the visit terminated;
      a time duration measure corresponding to each visit; and
      a histogram of the identified transversals formed from a plurality of counters arranged such that a traversal from a first web-page of the plurality of web-pages to a second web-page of the plurality of web-pages effects a decrement of a first counter of the plurality of counters, and an increment of a second counter of the plurality of counters;
   a database configured to provide efficient long-term storage of the data; and
   a performance analysis modifier block, operably coupled to the database and register, that is configured to periodically: (i) modify the data in the based on the transversals and time duration measures corresponding to the visits, ii) transfer the data from the register to the database, (iii) reset the register, and produce performance measures corresponding to each web-page of the plurality of web-pages based on the data in the database and the register.

2. The web-site performance analysis system of claim 1 wherein the register comprises a plurality of registers arranged and configured to operate in a sequential order such, that the data is ordered in the plurality of registers that correspond to sequentially successive time units, and an active register of the plurality of registers corresponds to a current time unit.

3. The web-site performance analysis system of claim 1 wherein the register comprises a plurality of parameter arrays, each parameter array corresponding to each web-page of the plurality of web-pages.

4. The web-site performance analysis system of claim 1 wherein the performance measures produced by the performance analysis modifier block include at least one of: (i) a measure of download duration, corresponding to times required to download each web-page of the plurality of web-pages, based on the at least one time duration measure corresponding to each visit, and (ii) a measure of dwell duration, corresponding to time durations of each visit, based on the at least one time duration measure corresponding to each visit.

5. The web-site performance analysis system of claim 4 wherein the performance analysis modifier block is further configured to obtain a connection speed associated with each visit and the measure of the download duration is further based on the connection speed of the associated visit.

6. The web-site performance analysis system of claim 4 wherein the measure of the download duration includes a plurality of time durations associated with tasks required to effect the download of each web-page.

7. The web-site performance analysis system of claim 1 wherein the performance analysis modifier block is configured to provide the performance measures relative to at least one of: (i) a parameter relative to the web-site, and (ii) a parameter relative to each web-page of the plurality of web-pages.

8. The web-site performance analysis system of claim 1 wherein the performance analysis modifier block is configured to provide the performance measures via a graphic display of each performance measure corresponding to each web-page.

9. The web-site performance analysis system of claim 1 wherein the performance measures include at least one of: (i) measure of entry rate to the web-site via each web-page of the plurality of web-pages, corresponding to the identification of the incoming link from which each visit originated as a web-page that is external from the web-site, and (ii) a measure of exit-rate from the web-site via each web-page of the plurality of web-pages, corresponding to the identification of the outgoing link to which each visit terminated as a web-page that is external from the web-site.

10. The web-site performance analysis system of claim 1 wherein the performance measures include a measure of backtracks from each web page of the plurality of web-pages, corresponding to the identification of the outgoing link to which each visit terminated being substantially identical to the identification of the incoming link from which each visit originated.

11. The web-site performance analysis system of claim 1 wherein the performance measures include a measure of popularity of each web page of the plurality of web-pages, corresponding to a number of visits to each web page of the plurality of web-pages.

12. The web-site performance analysis system of claim 1 wherein the performance measures include at least one of: (i) a measure of depth of each web page of the plurality of web-pages, corresponding to a number of visits to other web pages of the web-site during an access to the web-site that includes a visit to each web page, and (ii) a measure of depth-time of each web page of the plurality of web-pages, corresponding to a time duration of visits to the other web pages of the web-site during an access to the web-site that includes a visit to each web page.

13. The web-site performance analysis system of claim 12 wherein the visits to the other web pages correspond to a sequence of visits to effect a checkout procedure.

14. The web-site performance analysis system of claim 1 wherein the performance analysis modifier block is further configured to produce performance measures corresponding to the web-site, including at least one of: (i) numbers of web-pages visited during each access to the web-site, and (ii) time durations of each access to the web-site.

15. A method of providing a web-site performance analysis service that gathers data relative to visits to a plurality of web-pages that are associated with a web-site, comprising steps of:
   identifying traversals corresponding to each visit of the visits to the plurality of web-pages, each identified traversal having one of (i) an identification of an incoming link from which each visit originated and (ii) an identification of an outgoing link to which the visit terminated;
   measuring a time duration corresponding to each visit;
   forming a histogram of the identified transversals from a plurality of counters arranged such that a traversal from a first web-page of the plurality of web-pages to a second web-page of the plurality of web-pages effects a decrement of a first counter of the plurality of counters, and an increment of a second counter of the plurality of counters;

storing the identified transversals, time duration, and histogram data related to the visits to the plurality of web-pages associated with the web-site in an active register;

transferring the stored data from the register to a database and resetting the active register in when the stored data is transferred; and producing performance measures corresponding to each web-page of the plurality of web-pages based on the stored data in the database and the register.

16. The method of claim 15 wherein:

the identifying traversals step comprises at least one of identifying: (i) a first visit to a first page of the plurality of web-pages as corresponding to an initiation of access to the web-site, and (ii) a last visit to a last page of the plurality of web-pages as corresponding to a termination of the access to the web-site; and the producing performance measures step comprises at least one of producing: (i) a measure of an entry rate to the web-site via each web-page of the plurality of web-pages, corresponding to occurrences of the web-page being the first page, and (ii) a measure of an exit rate from the web-site via each web-page of the plurality of web-pages, corresponding to occurrences of the web-page being the last page.

17. The method of claim 15 wherein the producing performance measures step comprises producing a measure of backtracking via each web-page, based on a correspondence between the incoming link and the outgoing link.

18. The method of claim 15 wherein the producing performance measures step comprises producing a popularity measure of each web-page, based on occurrences of visits to each web-page.

19. The method of claim 15 wherein the producing performance measures step comprises producing statistics for each web-page based on the measured time duration corresponding to each visit.

20. The method of claim 15 wherein the time duration corresponds to at least one of: (i) a time duration to download the web-page at each visit, and (ii) a time duration of each visit to the web-page.

21. The method of claim 15 wherein the producing performance measures step comprises producing an accumulation of performance measures corresponding to several of the plurality of web-pages.

22. The method of claim 15 wherein the producing performance measures step comprises producing at least one of: (i) a measure of depth of each web page of the plurality of web-pages, corresponding to a number of visits to other web pages of the web-site during an access to the web-site that includes a visit to each web page, and (ii) a measure of depth-time of each web page of the plurality of web-pages, corresponding to a time duration of visits to the other web pages of the web-site during an access to the web-site that includes a visit to each web page.

23. The method of claim 22 wherein the visits to the other web pages correspond to a sequence of visits to effect a checkout procedure.

24. The method of claim 15 wherein the producing performance measures step comprises producing a measure of at least one of: (i) numbers of web-pages visited during each access to the web-site, and (ii) time durations of each access to the web-site.

25. The method of claim 15 wherein the storing step comprises utilizing a plurality of registers arranged and configured to operate in a sequential order, and the method further includes a step of reordering the plurality of registers when the data is transferred to the database, so that the data in the plurality of registers that correspond to sequentially successive time units, and the active register corresponds to a current time unit.

26. The method of claim 15 wherein the active register comprises a plurality of parameter arrays, each parameter array corresponding to each web-page of the plurality of web-pages.

27. The method of claim 15 further comprising a step of providing a graphic display corresponding to the traversals among the one or more web-pages.

28. The method of claim 20 wherein the time duration to download the webpage includes a plurality of time durations associated with tasks required to effect the download.

* * * * *

UNITED STATES PATENT AND TRADEMARK OFFICE
CERTIFICATE OF CORRECTION

PATENT NO. : 6,963,874 B2
DATED : November 8, 2005
INVENTOR(S) : Stephane Kasriel, Sara Swanson and Walter Mann It is certified that error appears in the above-identified patent and that said Letters Patent is hereby corrected as shown below:

Column 13,
Lines 22 and 34, replace "transversals" with -- traversals --;

Column 14,
Line 66, after "identified" replace "transversals" with -- traversals --;

Column 15,
Line 6, after "identified" replace "transversals" with -- traversals --;
Line 11, after "register" delete "in".

Signed and Sealed this

Fourteenth Day of February, 2006

JON W. DUDAS
*Director of the United States Patent and Trademark Office*